(12) United States Patent
Schedl et al.

(10) Patent No.: US 7,740,730 B2
(45) Date of Patent: Jun. 22, 2010

(54) METHOD OF CLOSING A CONTAINER WITH A LID

(75) Inventors: Adolf Schedl, Obergrafendorf (AT); Andreas Niederer, Melk (AT); Lambert Nekula, Hofstetten (AT); Martin Kornfeld, Klosterneuburg (AT); Robert Kitzberger, St. Pölten (AT)

(73) Assignee: Teich AG, Weinburg (AT)

( * ) Notice: Subject to any disclaimer, the term of this patent is extended or adjusted under 35 U.S.C. 154(b) by 0 days.

(21) Appl. No.: 11/514,059

(22) Filed: Aug. 31, 2006

(65) Prior Publication Data
US 2006/0289542 A1 Dec. 28, 2006

Related U.S. Application Data

(63) Continuation of application No. PCT/AT2005/000112, filed on Mar. 31, 2005.

(30) Foreign Application Priority Data
Apr. 15, 2004 (AT) .................. A 651/2004

(51) Int. Cl.
*B29C 65/18* (2006.01)
*B29C 65/76* (2006.01)
*B65D 43/02* (2006.01)

(52) U.S. Cl. ............ 156/290; 156/308.4; 156/324; 220/265; 220/359.3; 428/195.1

(58) Field of Classification Search .......... 156/290, 156/308.4, 324; 220/265, 266, 359.1–359.4; 428/195.1, 198, 200, 209, 211.1
See application file for complete search history.

(56) References Cited

U.S. PATENT DOCUMENTS 3,070,481 A * 12/1962 Schornstheimer .......... 156/242

| 4,264,392 A * | 4/1981 | Watt ................. 156/272.6 |
| 4,735,335 A * | 4/1988 | Torterotot .............. 220/270 |
| 5,316,603 A | 5/1994 | Akazawa et al. |
| 6,056,141 A | 5/2000 | Navarini et al. |

(Continued)

FOREIGN PATENT DOCUMENTS

DE 102 35 687 A1 2/2003

(Continued)

*Primary Examiner*—Richard Crispino
*Assistant Examiner*—Michael A Tolin
(74) *Attorney, Agent, or Firm*—Laurence A. Greenberg; Werner H. Stemer; Ralph E. Locher (57) ABSTRACT

A lid for closing containers includes an at least two-layered composite assembly. A layer facing the container seals against a container edge and forms an opening by layer separation, for removing contents. The layers have a continuous construction without weakening lines. The layer facing the container is made mainly of a plastic having an intrinsic tearing resistance being lower in the region of the opening than its adhesion to the layer facing away from the container in a remaining region and an adhesion to the container edge being greater at least in the region of an opening aid than to the other layer. The plastic adheres so strongly to the outer layer in the region of the opening that a region corresponding to the opening is torn out upon opening and a remaining layer of the lid facing the container continues to adhere to the container edge by sealing action.

8 Claims, 5 Drawing Sheets

U.S. PATENT DOCUMENTS

| | | | |
|---|---|---|---|
| 6,273,987 B1 * | 8/2001 | Wilkey | 156/277 |
| 6,761,940 B2 | 7/2004 | Kammerer et al. | |
| 2004/0013827 A1 | 1/2004 | Zuser et al. | |

FOREIGN PATENT DOCUMENTS

| | | | |
|---|---|---|---|
| DE | 102 04 968 A1 | | 8/2003 |
| DE | 20 2004 010 214 U1 | | 10/2004 |
| EP | 1 162 156 A1 | | 12/2001 |
| EP | 1 164 093 A1 | | 12/2001 |
| EP | 1 285 859 A2 | | 2/2003 |
| EP | 1 288 136 A2 | | 3/2003 |
| WO | WO 97/02997 | | 1/1997 |
| WO | WO 00/34149 | * | 6/2000 |
| WO | WO 01/26987 A1 | | 4/2001 |
| WO | WO 01/83208 | * | 11/2001 |
| WO | WO 03/066471 A1 | | 8/2003 |

* cited by examiner

METHOD OF CLOSING A CONTAINER WITH A LID

CROSS-REFERENCE TO RELATED APPLICATIONS

This is a continuation, under 35 U.S.C. §120, of copending International Application No. PCT/AT2005/000112, filed Mar. 31, 2005, which designated the United States; this application also claims the priority, under 35 U.S.C. §119, of Austrian Patent Application No. A 651/2004, filed Apr. 15, 2004; the prior applications are herewith incorporated by reference in their entirety.

BACKGROUND OF THE INVENTION

Field of the Invention

The invention relates to a lid for closing containers being based on an at least two-layered composite assembly and having an opening aid. An assembly layer facing the container seals against a container edge and forms an opening, which is produced when the assembly layers are separated, for removal of package contents located in the container. The invention also relates to a method for producing the lid.

It is known to use at least two-layered lids for closing containers in order, for example, to make the aroma protection required for food possible.

It has furthermore been found that, in particular in the case of perishable foods, the consumer has an increased need for information with regard to origin, ingredients and keepability. In order to provide sufficient space for that information, it is nowadays printed on the outer layer of the two-layered lid, while the inner layer as far as possible remains unprinted. That is also because possible contact of printing inks with the foods is to be avoided.

The above-mentioned two-layered lids also have increased aroma protection when a removal opening is provided in that layer of the lid facing the package contents. That is preferably effected by providing weakening lines which are exposed when the package is opened, that is when the lid layers are separated from one another. Pressing-in those weakening lines produces a removal opening through which package contents can be completely or partly removed. It is advantageous in large packages, in particular if the outer lid layer is provided with a pressure-sensitive adhesive on its inner side, for example, in order for it to be possible to close the removal opening again.

Those packaging devices nevertheless have the disadvantage that the weakening lines in the lid layer facing the package contents define a potential defect location, in particular when the outer layer of the lid is damaged during transport, for example, and moisture or possibly impurities in the form of bacteria can thus find its or their way into the package contents through the weakening lines. Furthermore, in particular aluminum foils display the characteristic of undesirable corrosion in the region of the weakening lines.

SUMMARY OF THE INVENTION

It is accordingly an object of the invention to provide a lid with a removal opening for closing containers and a method for producing the lid, which overcome the hereinafore-mentioned disadvantages of the heretofore-known devices and methods of this general type for at least two-layered lids for closing containers, while at the same time providing a removal opening in the lid to which the consumer can gain access in a simple way, preferably upon opening a package.

With the foregoing and other objects in view there is provided, in accordance with the invention, a lid for closing a container having a container edge. The lid comprises a composite assembly having at least two continuous assembly layers and an opening aid in an opening aid region. The at least two assembly layers include an assembly layer facing the container and an assembly layer facing away from the container. The assembly layer facing the container seals against the container edge and forms a removal opening produced by separating the assembly layers for removal of package contents located in the container. The assembly layer facing the container has an assembly adhesion to the assembly layer facing away from the container. The removal opening defines a removal opening lid region and a remaining lid region. The assembly layer facing the container is made mainly of a plastic having an intrinsic tearing resistance being lower in the removal opening lid region than the assembly adhesion to the assembly layer facing away from the container in the remaining lid region. The plastic of the assembly layer facing the container has an assembly adhesion to the container edge being greater at least in the opening aid region than the assembly adhesion to the assembly layer facing away from the container.

With the objects of the invention in view, there is also provided a method for producing a lid, which comprises subjecting the composite assembly formed of the layers to increased pressure and increased temperature in a predetermined region for increasing the assembly adhesion between the assembly layers in the predetermined region in comparison with a remaining lid cross section.

With the objects of the invention in view, there is additionally provided a method for producing a lid, which comprises induction welding the assembly layers in a predetermined region to bring about increased assembly adhesion between the assembly layers in the predetermined region in comparison with a remaining lid cross section.

With the objects of the invention in view, there is furthermore provided a method for producing a lid, which comprises ultrasonic welding the assembly layers together in a predetermined region to bring about increased assembly adhesion between the assembly layers in the predetermined region in comparison with a remaining lid cross section.

With the objects of the invention in view, there is concomitantly provided a method for producing a lid, which comprises connecting the assembly layers with a bonding agent having latent cross-linking accelerators. The assembly layers are then subjected to increased pressure and/or increased temperature in a predetermined region for initiating a cross-linking reaction by the accelerators to achieve increased assembly adhesion in the predetermined region in comparison to a remaining lid cross section.

The effect of this construction and method is that the plastic present in the assembly layer facing the container adheres so strongly to the outer assembly layer in the region of the removal opening, that a region corresponding to the removal opening is torn out when opening takes place, while the remaining layer of the lid, which faces the container, continues to adhere to the container edge through the sealing action in relation thereto. In order to ensure that the consumer can gain access to the package contents through the removal opening in a simple way, the consumer takes hold of the lid by its opening aid and peels the layer facing away from the container off the plastic layer below. The force applied breaks the plastic layer from the container edge at least in the region of the opening aid so that the container remains partly closed, with the exception of the removal opening.

Furthermore, the risk of impurities possibly finding their way in is avoided in the unopened state since the material layers are themselves continuous, that is no weakening lines at all are provided for forming the potential removal opening.

Other features which are considered as characteristic for the invention are set forth in the appended claims.

Although the invention is illustrated and described herein as embodied in a lid with a removal opening for closing containers and a method for producing the lid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 5:
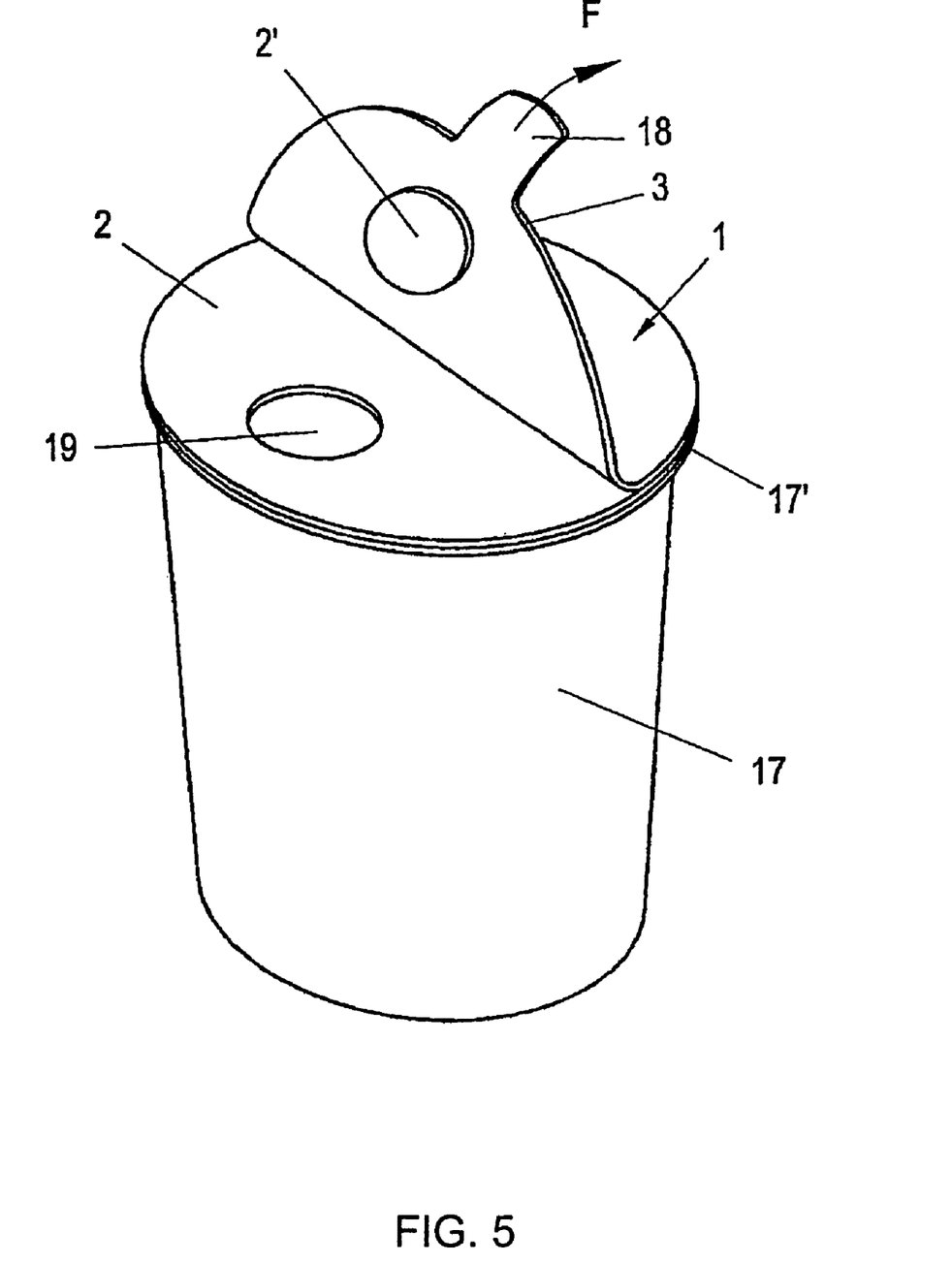
FIGS. 5 and 6 are perspective views showing the use of the lid according to the invention for closing a container.
Figure 6:
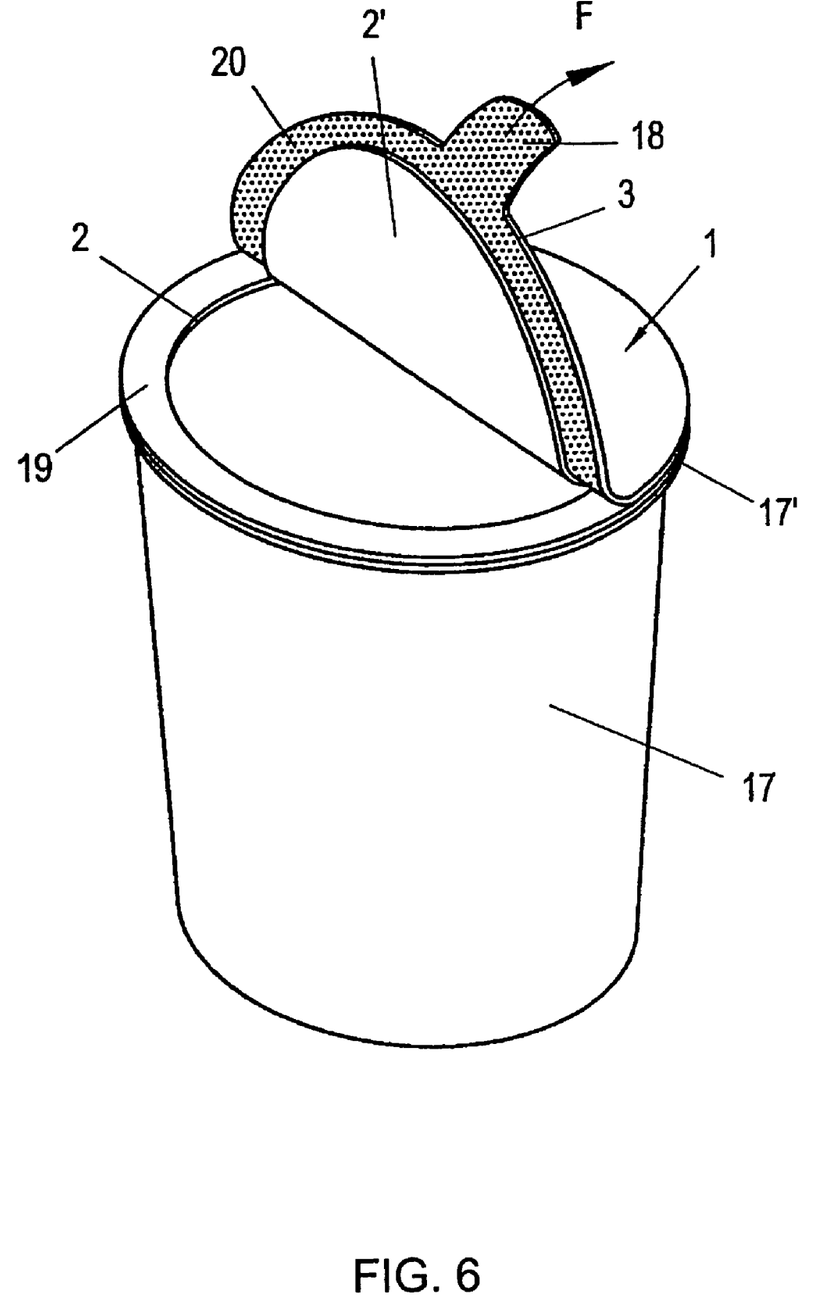

Referring now in detail to the figures of the drawings as a whole, it is seen that in order to produce a lid 1 according to the invention, mainly plastics, in the form of either monopoly or multiply layers, are used as an assembly layer 2, that is as that assembly layer of the lid facing a container 17 seen in FIGS. 5 and 6. The assembly layer 2 made of plastic has a thickness in a range of 6 to 100 μm, for example. The plastics used are provided mainly from the group of polystyrenes, polyethylenes, polyesters and polypropylenes, corresponding copolymers, as well as their mixtures. The plastics themselves can be filled or unfilled, and talc, silica or chalk are advantageously used as fillers.

Figure 1A:
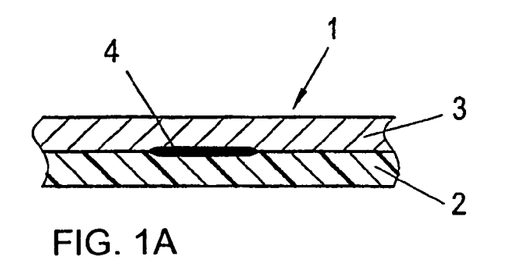
FIGS. 1A to 1F are fragmentary, sectional views of possible embodiments of a lid according to the invention.
Figure 1B:
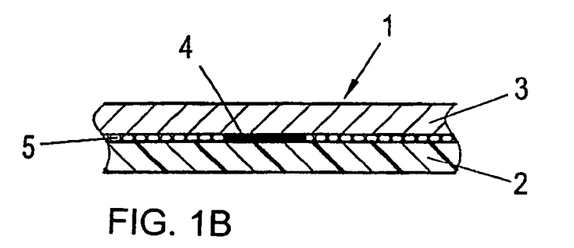

A particularly advantageous embodiment of the lid according to the invention is obtained if the plastic layer 2 facing the container is sealed against a container edge 17' of the container 17. This makes it possible to dispense with an additional sealing medium, for example in the form of a sealing lacquer, as is illustrated in FIG. 1E.

Furthermore, the assembly layer 2 facing the container can be provided, if appropriate, with an informative imprint on its outer side, that is the side facing the consumer during peeling.

An assembly layer 3 facing away from the container is made from an aluminum foil with a thickness of 10 to 100 μm, for example. However, it is also conceivable to use a plastic film of increased strength and, if appropriate, to combine it with aluminum or paper on its outer side.

A peelable assembly for the lid 1 is produced after selection of the materials for the layers 2 and 3. This is effected by coextrusion, for example, which has particular advantages when plastics are used in both the layer 2 and the layer 3. Furthermore, it is possible to apply the layer 2 to the layer 3 by extrusion coating. This is effected in such a way that the plastic of the layer 2 is extruded onto the layer 3 and is then connected to it in such a way that the peelability of the layers 2 and 3 is maintained.

It is furthermore conceivable to produce the assembly formed of the layers 2 and 3 by laminating. This can take place with or without addition of bonding agents, depending on the type of plastic and/or its content of copolymers.

After production of the peelable assembly for the lid 1, it is printed and, if necessary, provided with a sealing medium. In this connection, as is seen in FIG. 1E, a conventional sealing lacquer 7 is applied to that side of the plastic layer 2 facing the container 17, and it is advantageous to construct it with a rough surface in order to considerably ease unstacking of the lids 1 which are usually stored one above another in magazines. A rough-surface structure in the form of geometrically disposed rough-surface spacers 7' seen in FIG. 1F is especially advantageous.

Figure 1C:
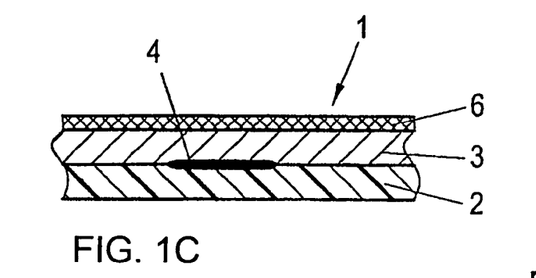
Figure 1D:
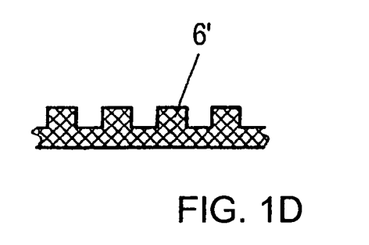
Figure 1E:
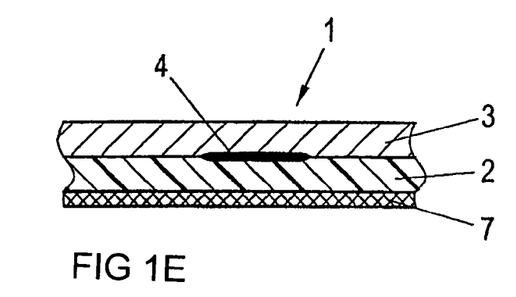
Figure 1F:
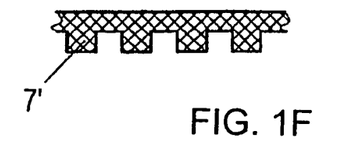

Furthermore, a printing lacquer 6 on the outer assembly layer 3, as is seen in FIGS. 1C and 1D, can also have a rough surface in order to additionally ease unstacking and, if appropriate, achieve a particular printing decoration. In this connection, the printing lacquer 6 is advantageously provided in the form of geometrically disposed spacers 6' seen in FIG. 1D. In order to more precisely mark a region 4 in which assembly adhesion between the layers 2 and 3 is increased in comparison with a remaining lid region, it can have a smooth, informative printed representation in its surface structure in the same way in order to indicate to the consumer the possibility of partial removal through a removal opening which will be produced in the region 4.

Figure 2:
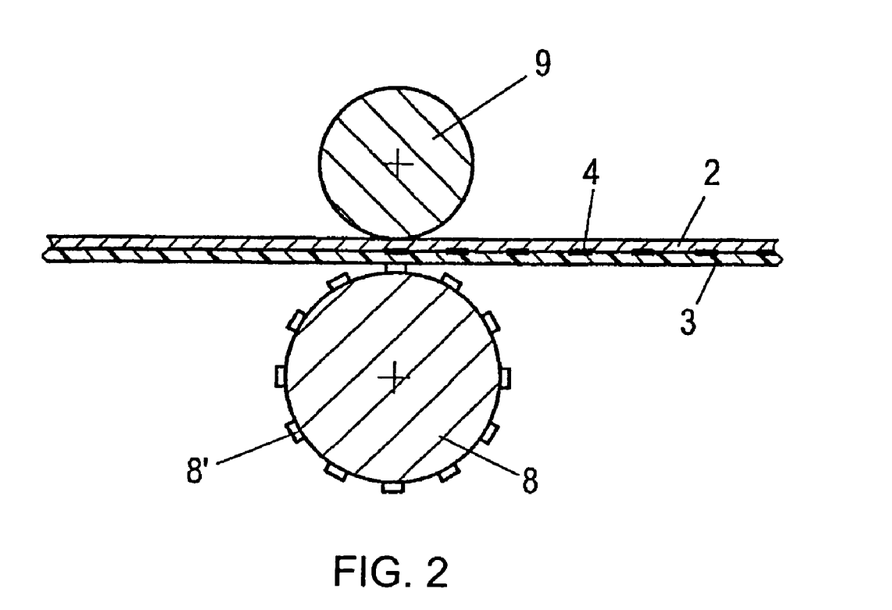
FIGS. 2 to 4 are fragmentary, sectional views illustrating possible variant methods for producing a region of increased assembly adhesion within the lid.
Figure 3:
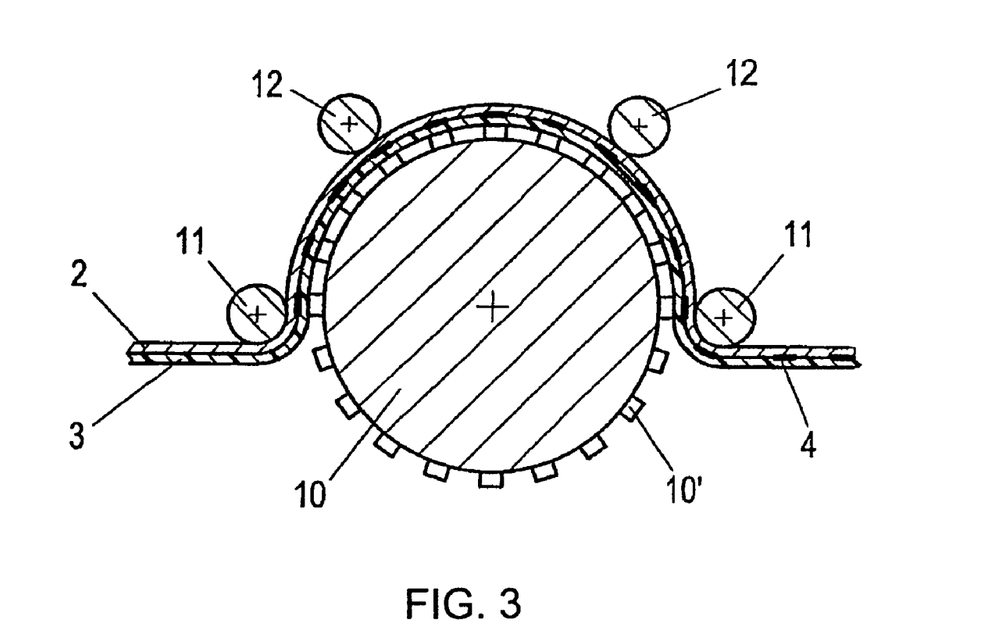

In order for it to then be possible to provide the region 4 of increased assembly adhesion between the layers 2 and 3, which will also correspond to a shape of a removal opening 19 as shown in FIG. 5, the following methods are available, for example:

According to the illustrations in FIGS. 2 and 3, production of the region 4 of increased assembly adhesion takes place according to what is known as a roller principle. In this connection, rollers 8 or 10 are provided with raised portions 8' and 10' on their surface. The rollers themselves are heated to a temperature of between 100 and 300° C.

According to FIG. 2, the assembly formed of the layers 2 and 3 is guided through between the roller 8 and a roller 9. Bearing pressure of the rollers in the nip and provision of the raised portions 8' produces the region 4 of increased assembly adhesion, as is indicated diagrammatically in FIG. 1A, for example.

According to FIG. 3, in order to increase dwell times, a heated drum is provided as the roller 10, on the surface of which the assembly layers 2 and 3 are guided by guide rollers 11. The shape and size of the drum and the raised portions 10' provided thereon make it possible to increase the dwell times considerably in comparison with the guidance according to FIG. 2. The assembly layers 2 and 3 are subjected to the pressure of the drum roller, in particular of the raised portions 10', over a wide area, by virtue of pressing rollers 12, so that particularly strong assembly adhesion, that is virtually welding together of the assembly layers 2 and 3, can be achieved in the region 4.

Figure 4:
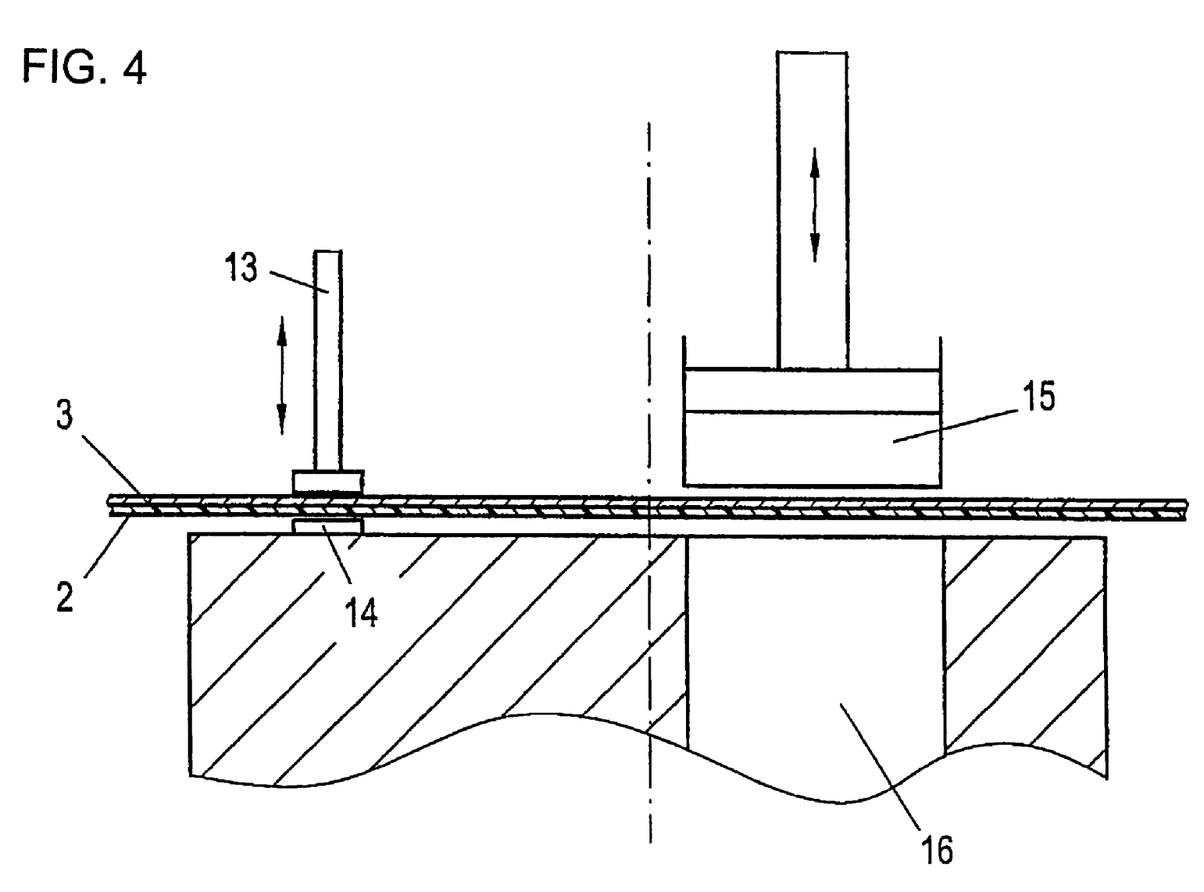

FIG. 4 shows that the production of the region of increased assembly adhesion can also be carried out continuously during punching out of material present in roll form into the individual lids. In this connection, the assembly layers 2, 3 are guided through as roll material between a punching tool 13 and a heated plate 14, the punching tool 13 is lowered onto the layer 3 and at the same time, by virtue of the heated plate 14, the two layers 2 and 3 are welded together through the layer 3. This makes it possible to achieve increased assembly bonding as provided in the region 4 and immediately afterwards, with the aid of a conventional punching tool 15 which punches the assemblies still present as roll material, as shown in FIG. 1A, for example, into the individual lids, that can be removed through an outlet opening 16.

If the assembly layers 2 and 3 are made of thermoplastic materials, however, they can be heated until liquid and pressed together under pressure in a predetermined region, preferably the region 4 of increased assembly adhesion to be formed. This is effected by ultrasonic or induction welding, for example.

It is furthermore possible to apply a bonding agent to which latent cross-linking accelerators have been added between the layers 2 and 3 by conventional laminating methods. When predetermined regions of this assembly are subjected to increased pressure and increased temperature, this initiates a cross-linking reaction so that increased assembly adhesion in comparison with the remaining lid cross section is achieved in this predetermined region 4.

The assembly adhesion, which is increased in the region 4, is then measured by using the average peeling force necessary for separating the assembly layers 2 and 3. In this connection, a specimen formed of the assembly layers 2 and 3 is produced, which is 15 mm wide in the running direction and approximately 300 mm long in the longitudinal direction. The assembly layers 2 and 3 are then separated from one another at their ends by hand and clamped into a clamping configuration of a tension testing device, for example one from the company Zwick. Further testing is effected at a pull-off rate of 100 mm/min, a clamping length of maximally 50 mm and a pull-off angle of 90°. The measurement result, or the profile of the peeling resistance, corresponds to an assembly adhesion measurement and is recorded either on the tension testing device itself or with a diagram recorder. Average values in N/15 mm are calculated from the measurement results of the tests. This reveals that measurement values of >5 N/15 mm to a maximum of 160 N/15 mm are achieved in the region 4 of increased assembly adhesion, that is the assembly adhesion in the region 4 is so great that upon opening, as shown in FIG. 5, part of the assembly layer 2 is "torn out" and, due to the increased assembly adhesion, continues to adhere to the layer 3 as a partial region 2'.

On the other hand, in a remaining container cross section, an assembly adhesion of 0.1 to 5 N/15 mm is present, noting that a "comfortable peeling force" for the consumer is provided by assembly adhesion in a range from 0.2 to 0.4 N/15 mm. This assembly adhesion is also lower than that between the layer 2 and the container edge 17' so that the layers 2 and 3 can be separated (peeled) from one another in a simple way in the remaining lid region. This operation is explained below with reference to FIG. 5:

In this connection, an opening aid 18 in the form of a grip or pull tab is pulled in the direction of an arrow F so that the layers 2 and 3 are separated (peeled) from one another by the force being applied. Due to the increased assembly adhesion in the region 4 (see FIG. 1A), the layer 2' is then torn out of the plastic layer 2, corresponding to the size of the removal opening 19, in such a way that it continues to adhere to the layer 3, that is to the assembly layer facing away from the container, due to the increased assembly adhesion. Furthermore, the force being applied breaks the plastic layer 2 from the container edge 17' at least in the region of the opening aid 18 so that the container remains partly closed, with the exception of the removal opening. The container 17 consequently remains mostly closed by virtue of the seal seam strength between the container edge 17' and the layer 2, and the package contents, such as a yogurt drink or even spices, can be removed through the removal opening 19.

However, if only part of the package contents is to be removed and the container is then to be reclosed at least loosely, the assembly layer 3 facing away from the container is advantageously provided with a pressure-sensitive adhesive 20. As is shown in FIG. 6, the container 17 is opened by pulling off the lid 1 in the direction of the arrow F so that the package contents can be removed in part. Then, the layer 3 is again placed over the assembly layer 2 remaining after opening in the direction counter to the arrow F and pressed at least lightly onto it, so that the adhesive effect of the pressure-sensitive adhesive 20 can be exerted. The pressure-sensitive adhesive 20 can also be present in the region of the grip tab 18 so that the grip tab can be fixed by folding it over the container edge 17', which improves the reclosability of the container 17 overall.

In summary, an illustrative embodiment of the invention can be represented as follows:

According to the invention, a lid 1 is indicated, which is formed substantially of the assembly layers 2 and 3, with the assembly layer 2 facing the container being made continuously, that is without any weakening lines, of a plastic of which the intrinsic tearing resistance is lower in the region of a potential removal opening than its adhesion to the outer assembly layer 3, that is to the layer facing away from the container. This leads to a partial region 2' of the layer 2 corresponding to the removal opening 19 being torn out when the layer 3 is peeled off from the layer 2 lying below it with the opening aid 18, whereas the remaining assembly layer continues to adhere to the container edge 17'. Furthermore, the force applied during peeling-off breaks the plastic layer 2 from the container edge 17', at least in the region of the opening aid 18, so that the container remains partly closed, with the exception of the removal opening. This effect is achieved by specific adjustment of the assembly adhesion on one hand between the layers 2, 3 of the lid element and on the other hand between the container edge 17' and the layer 2 facing the container. The assembly adhesion is thus increased in the region 4 of the potential removal opening 19 in comparison with the assembly adhesion present between the layers 2 and 3. However, it is at least the same as that assembly adhesion between the layer 2 facing the container, that is that assembly adhesion which brings about the seal seam strength between the inner lid layer 2 and the container edge 17'. This means that while it is true that a removal opening 19 is formed when the layers 2, 3 are separated from one another, the inner layer 2 nevertheless continues to adhere mostly to the container edge 17'. This makes it possible for package contents also to be removed in part and for the container to be reclosed at least partly after their removal.

We claim:

1. A method of closing a container with a lid, the method which comprises the following steps:
    forming the lid entirely without weakening lines from a composite assembly having only two continuous assembly layers without weakening lines and an opening aid in an opening aid region, the two assembly layers including an assembly layer facing the container and an assembly layer facing away from the container;
    bonding the composite assembly to the container as the lid provided entirely without weakening lines;
    the assembly layer facing the container sealing against a container edge and forming a removal opening produced by separating the assembly layers for removal of package contents located in the container;

the assembly layer facing the container having an assembly adhesion to the assembly layer facing away from the container provided without a bonding agent between the assembly layers;

producing the assembly layer facing the container mainly of a plastic having an intrinsic tearing resistance that is lower in a removal opening lid region than the assembly adhesion to the assembly layer facing away from the container in the remaining lid region; and producing the assembly layer facing the container with an assembly adhesion to the container edge greater at least in the opening aid region than the assembly adhesion to the assembly layer facing away from the container; and subjecting the composite assembly formed of the assembly layers of the lid without weakening lines to increased pressure and increased temperature with sealing tools in the form of rollers, one of said rollers having raised surface portions corresponding to a predetermined region for the removal opening having increased assembly adhesion adjusted to lie in a range from 5 N to 160 N/15 mm and portions which are not raised corresponding to regions outside the removal opening having assembly adhesion adjusted to lie in a range from 0.1 to 5 N/15 mm.

2. The method according to claim 1, which comprises adjusting the assembly adhesion outside the removal opening to lie in a range from 0.2 to 0.4 N/15 mm.

3. The method according to claim 1, which comprises selecting the plastic of the assembly layer facing the container from the group consisting of polyethylene, polypropylene, polyester, polystyrenes, copolymers thereof and mixtures thereof.

4. The method according to claim 3, which comprises adding fillers to the plastic of the assembly layer facing the container.

5. The method according to claim 4, wherein the fillers are at least one of talc, silica, and/or chalk.

6. The method according to claim 1, which comprises utilizing a plastic for the assembly layer facing the container to seal against the container edge.

7. The method according to claim 1, which comprises providing the plastic assembly layer facing the container with a heat-sealable layer.

8. The method according to claim 1, which comprises forming the assembly layer facing away from the container with aluminum or plastic.

\* \* \* \* \*